(12) United States Patent
Han et al.

(10) Patent No.: US 12,026,617 B2
(45) Date of Patent: **\*Jul. 2, 2024**

(54) NEURAL NETWORK METHOD AND APPARATUS

(71) Applicant: Samsung Electronics Co., Ltd., Suwon-si (KR)

(72) Inventors: Songyi Han, Hwaseong-si (KR); Seungwon Lee, Hwaseong-si (KR); Minkyoung Cho, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,009

(22) Filed: May 5, 2023

(65) Prior Publication Data

US 2023/0274140 A1   Aug. 31, 2023

Related U.S. Application Data

(63) Continuation of application No. 16/897,461, filed on Jun. 10, 2020, now Pat. No. 11,681,915.

(30) Foreign Application Priority Data

Dec. 26, 2019 (KR) .......................... 10-2019-0175484

(51) Int. Cl.
  *G09G 5/00*   (2006.01)
  *G06N 3/08*   (2023.01)
  *G06N 20/10*  (2019.01)

(52) U.S. Cl.
  CPC .............. *G06N 3/08* (2013.01); *G06N 20/10* (2019.01)

(58) Field of Classification Search
  CPC ........ G06N 3/08; G06N 20/10; G06N 3/0454; G06N 3/04; G06F 17/153
  USPC .............................. 706/20, 25; 345/156, 174
  See application file for complete search history.

(56) References Cited

U.S. PATENT DOCUMENTS

| | | |
|---|---|---|
| 10,460,230 B2 | 10/2019 | Brothers et al. |
| 2018/0253636 A1 | 9/2018 | Lee et al. |
| 2018/0285715 A1 | 10/2018 | Son et al. |
| 2019/0065942 A1 | 2/2019 | Verrilli et al. |
| 2019/0130250 A1 | 5/2019 | Park et al. |
| 2019/0138898 A1 | 5/2019 | Song et al. |
| 2019/0179674 A1 | 6/2019 | Huang et al. |
| 2019/0213439 A1 | 7/2019 | Liu et al. |
| 2019/0303762 A1 | 10/2019 | Sui et al. |

(Continued)

FOREIGN PATENT DOCUMENTS

| | | |
|---|---|---|
| KR | 10-2016-0143505 A | 12/2016 |
| KR | 10-2018-0101978 A | 9/2018 |

(Continued)

*Primary Examiner* — Thuy N Pardo
(74) *Attorney, Agent, or Firm* — NSIP Law

(57) ABSTRACT

A processor-implemented method of performing a convolution operation is provided. The method includes obtaining input feature map data and kernel data, determine the kernel data based on a number of input channels of the input feature map, a number of output channels of an output feature map, and a number of groups of the input feature map data and a number of groups of the kernel data related to the convolution operation, and performing the convolution operation based on the input feature map data and the determined kernel data.

20 Claims, 8 Drawing Sheets

1

Input
24x24

Feature maps
4@20x20

Feature maps
4@10x10

Feature maps
8@8x8

Feature maps
8@4x4

Output
20@1x1

Convolution    Subsampling    Convolution    Subsampling  Convolution

(56) References Cited

U.S. PATENT DOCUMENTS

| | | | |
|---|---|---|---|
| 2020/0026422 A1 | 1/2020 | Seomoon et al. | |
| 2020/0065646 A1 | 2/2020 | Mahmoud et al. | |
| 2020/0159809 A1 | 5/2020 | Catthoor et al. | |
| 2020/0250842 A1 | 8/2020 | Lee | |
| 2020/0302215 A1 | 9/2020 | Sombatsiri | |
| 2021/0064992 A1 | 3/2021 | Park et al. | |
| 2021/0117781 A1 | 4/2021 | Kim et al. | |
| 2021/0142106 A1 | 5/2021 | Quader et al. | |
| 2021/0150248 A1* | 5/2021 | Desappan | G06N 3/048 |
| 2021/0182676 A1 | 6/2021 | Zlateski et al. | |
| 2021/0192346 A1 | 6/2021 | Taylor et al. | |
| 2021/0248413 A1 | 8/2021 | Jang | |
| 2021/0326571 A1 | 10/2021 | Nakvosas | |
| 2021/0342608 A1 | 11/2021 | Smolyanskiy et al. | |
| 2022/0114388 A1 | 4/2022 | Li et al. | |
| 2022/0357946 A1 | 11/2022 | Qadeer et al. | |
| 2023/0252298 A1* | 8/2023 | Song | G06N 3/045 |
| | | | 706/20 |

FOREIGN PATENT DOCUMENTS

| | | |
|---|---|---|
| KR | 10-2021-0024865 A | 3/2021 |
| KR | 10-2021-0045225 A | 4/2021 |
| WO | WO 2019/082290 A1 | 5/2019 |
| WO | WO 2019/119301 A1 | 6/2019 |

\* cited by examiner

FIG. 5

NEURAL NETWORK METHOD AND APPARATUS

CROSS-REFERENCE TO RELATED APPLICATIONS

This application is a Continuation Application of U.S. patent application Ser. No. 16/897,461 filed on Jun. 10, 2020, which claims the benefit under 35 USC § 119(a) of Korean Patent Application No. 10-2019-0175484, filed on Dec. 26, 2019, in the Korean Intellectual Property Office, the entire disclosure of which is incorporated herein by reference for all purposes.

BACKGROUND

1. Field

The present disclosure relates to a neural network method and apparatus.

2. Description of Related Art

A neural network is a processor-implemented computing system which is implemented by referring to a computational architecture. Neural networks have an operation structure in which a large number of processing devices that implement simple functions may be connected in parallel, and are widely used as a new technique to address issues that may have been difficult to solve by implementing typical techniques. The neural network may have a generalization ability to generate a relatively correct output for an input pattern that has not be used for training, based on a result of training.

Neural network devices perform a large amount of computations on input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method of performing a convolution operation includes obtaining input feature map data and kernel data, manipulating the kernel data based on a number of input channels of the input feature map, a number of output channels of an output feature map, and a number of groups of the input feature map data and a number of groups of the kernel data related to the convolution operation, and performing the convolution operation based on the input feature map data and the manipulated kernel data.

The manipulating of the kernel data may include generating a default tensor, and replacing one or more elements of the default tensor with the kernel data.

The default tensor may include a tensor comprising zeros.

A size of the default tensor may be determined based on the number of input channels and the number of output channels.

The replacing of the one or more elements of the default tensor with the kernel data may include sequentially replacing the one or more elements of the default tensor with the kernel data in a first direction.

The first direction may be a direction corresponding to the output channels.

Each of the input feature map data and the kernel data may include data on which a group convolution operation is performed.

In a general aspect, a neural network apparatus includes one or more processors configured to obtain input feature map data and kernel data, manipulate the kernel data based on a number of input channels of the input feature map, a number of output channels of an output feature map, and a number of groups of the input feature map data and a number of groups of the kernel data related to a convolution operation, and perform the convolution operation based on the input feature map data and the manipulated kernel data.

The processor may be further configured to generate a default tensor, and replace one or more elements of the default tensor with the kernel data.

The default tensor may include a tensor comprising zeros.

A size of the default tensor may be determined based on the number of input channels and the number of output channels.

The processor may be further configured to sequentially replace the one or more elements of the default tensor with the kernel data in a first direction.

The first direction may be a direction corresponding to the output channels.

Each of the input feature map data and the kernel data may include data on which a group convolution operation is performed.

The apparatus may include a memory storing instructions that, when executed by the one or more processors, configure the one or more processors to perform the obtaining of the input feature map data and kernel data, the manipulating of the kernel data, and the performing of the convolution operation.

Other features and aspects will be apparent from the following detailed description, the drawings, and the claims.

BRIEF DESCRIPTION OF DRAWINGS

FIG. 5 illustrates an example of group convolution, in accordance with one or more embodiments;

Figure 1:
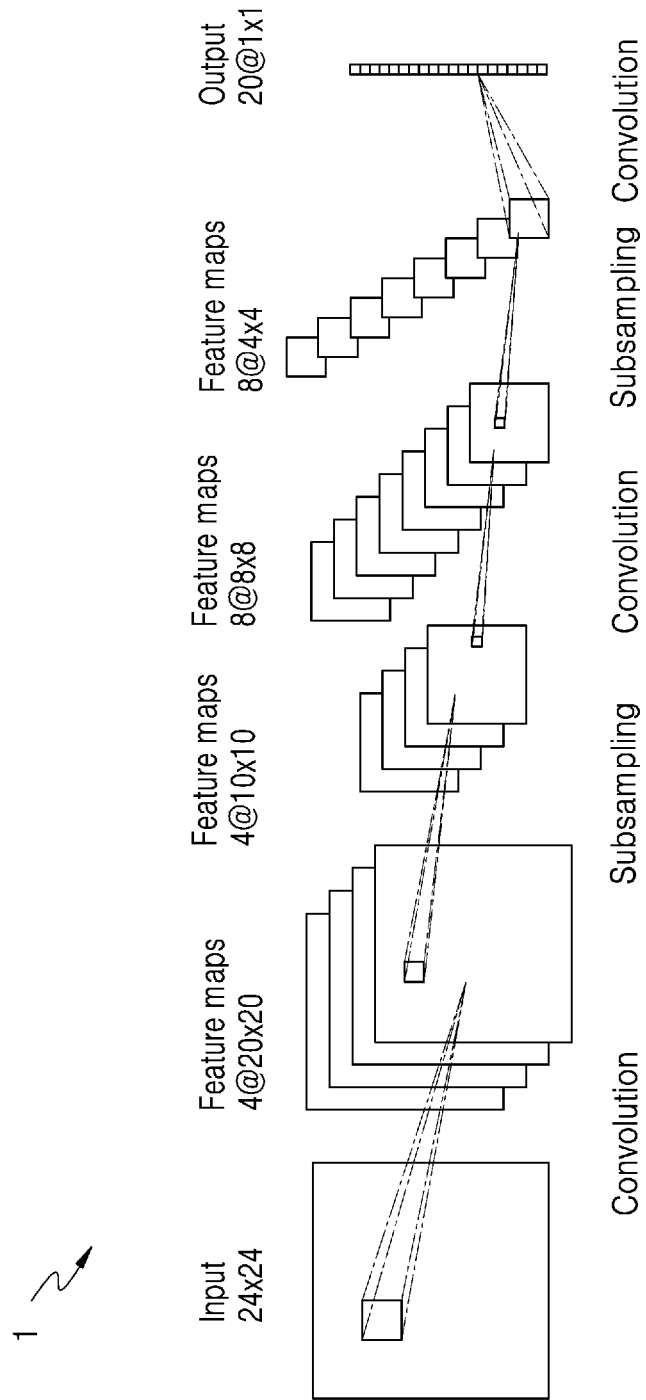
FIG. 1 illustrates an example architecture of a neural network, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of the application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing various examples only, and is not to be limiting of the examples. The articles "a," "an," and "the" are intended to include the plural forms as well, unless the context clearly indicates otherwise. It will be further understood that the terms "comprises/comprising" and/or "includes/including," when used herein, specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 illustrates an example architecture of a neural network 1, in accordance with one or more embodiments.

Referring to FIG. 1, the neural network 1 may have an architecture of a deep neural network (DNN) or n-layer neural network, as a non-limiting example. The DNN or n-layer neural network may include a plurality of layers. For example, the deep neural network may include an input layer to which input data is applied, an output layer for outputting a result derived through prediction based on training and the input data, and a plurality of hidden layers for performing a neural network operation between the input layer and the output layer. In such an example, the DNN may be, or correspond to, one or more of a fully connected network, a convolution neural network (CNN), a recurrent neural network (RNN), deep belief networks, restricted boltzman machines and the like, or may include different or overlapping neural network portions respectively with such full, convolutional, or recurrent connections, according to an algorithm used to process information. The neural network may be configured to perform, as non-limiting examples, speech recognition and voice recognition by mutually mapping input speech or voice data and output speech or voice data, e.g., in a nonlinear relationship based on deep learning. Such deep learning is indicative of processor implemented machine learning schemes for solving issues, such as issues related to automated image or speech recognition from a data set, as non-limiting examples.

The neural network 1 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, in an example, some convolutional layers are depicted in a convolutional neural network corresponding to an example of the neural network 1, but the convolutional neural network may further include a pooling layer or a pulley connected layer in addition to the depicted convolutional layers.

The neural network 1 may have an architecture having a plurality of layers including input images, feature maps, and outputs. In the neural network 1, the input image is subject to a convolution operation with a filter referred to as a kernel, and as a result, feature maps are output. The generated output feature maps at this time are input feature maps, and a convolution operation with the kernel is performed again, and as a result, new feature maps are output. As a result of the convolution operations being repeatedly performed, a result of recognition with respect to features of an input image may be finally output through the neural network 1.

For example, when an image having a pixel size of 24*24 is input to the neural network 1 of FIG. 1, the input image may be output as four channel feature maps having a pixel size of 20*20 through a convolution operation with a kernel. Subsequently, the feature maps having a pixel size of 20*20 are reduced in size through repeated convolution operations with the kernel, and finally features having a pixel size of 1*1 may be output. The neural network 1 filters and outputs robust features that may represent a whole image from an input image by repeatedly performing convolutional operations and sub-sampling (or pooling) operations on the various layers, and a recognition result of the input image may be obtained through finally outputted features.

FIGS. 2A-2C and 3 illustrate examples of a convolution operation of a neural network, in accordance with one or more embodiments.

Figure 2A:
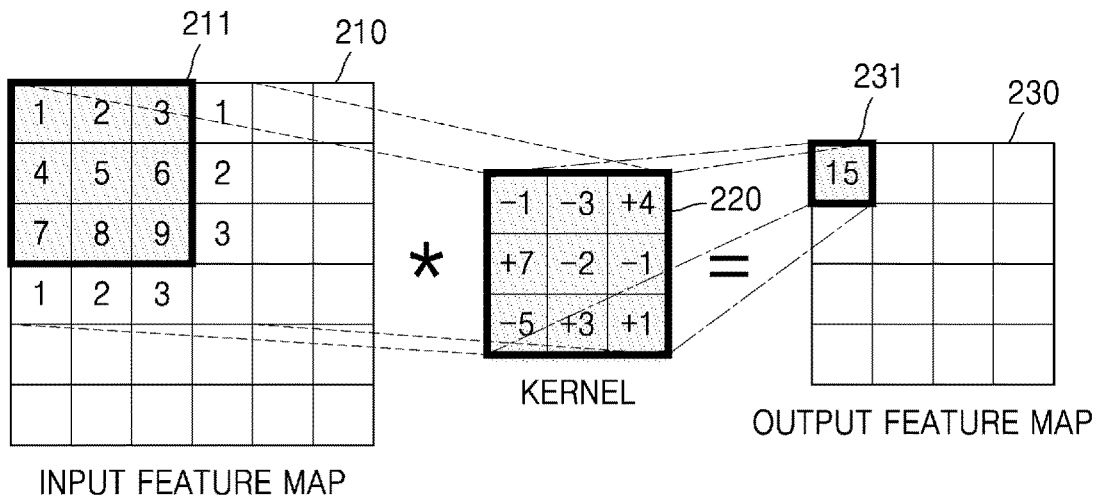
FIGS. 2A-2C and 3 illustrate example convolution operations of a neural network, in accordance with one or more embodiments.

Referring to FIG. 2A, in an example, an input feature map data 210 has a pixel size of 6*6, the kernel data 220 has a pixel size of 3*3, and the output feature map data 230 has a pixel size of 4*4, but the example is not limited thereto. The neural network may be implemented with feature maps and kernels of various different sizes. Also, values defined in the input feature map data 210, the kernel data 220, and the output feature map data 230 are all exemplary values, and the present embodiments are not limited thereto.

A convolution operation is performed while the kernel data 220 slides in a region (or tile) unit having a pixel size of 3*3 in the input feature map data 210. The convolution operation denotes an operation of outputting each pixel value of the feature map data 230 by performing a multiplication between each pixel value of a region of the input feature map data 210 and a corresponding weight which is an element of kernel data 220 and adding all the values obtained by the multiplication.

First, the kernel data 220 may be subjected to a convolution operation with the first region 211 of the input feature map data 210. That is, pixel values 1, 2, 3, 4, 5, 6, 7, 8, and 9 of the first region 211 are multiplied by weights −1, −3, +4, +7, −2, −1, −5, +3, and +1, which respectively are elements of the kernel data 220, and as a result −1, −6, 12, 28, −10, −6, −35, 24, and 9 are obtained. Next, 15, which is a result of adding the obtained values 1, −6, 12, 28, −10, −6, −35, 24, and 9, is calculated, and a pixel value 231 of the first row and the first column of the output feature map data 230 is determined to be 15. In an example, the pixel value 231 of the first row and the first column of the output feature map data 230 corresponds to the first region 211.

Figure 2B:
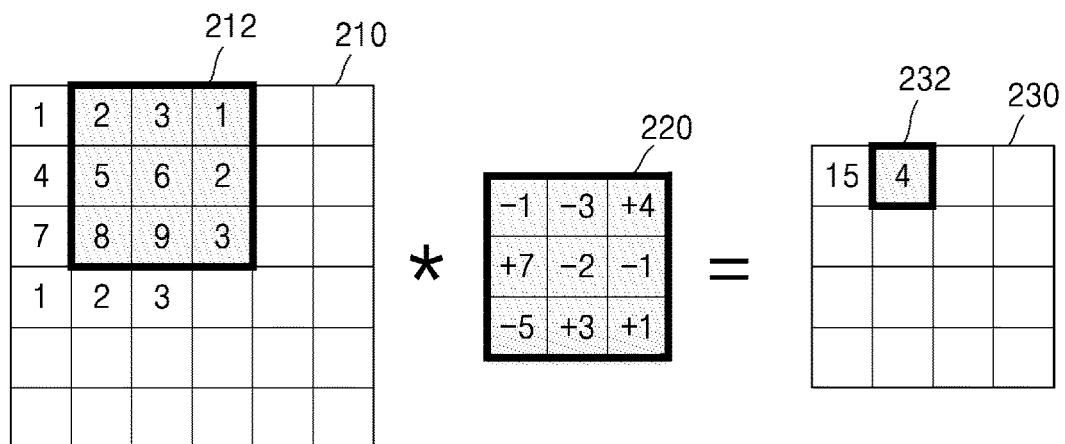

Referring to FIG. 2B, similar to the discussion above, a convolution operation between a second region 212 of the input feature map data 210 and the kernel data 220 is performed, and a result of 4, which is a pixel value 232 of the first row and second column of the output feature map data 230, is determined.

Figure 2C:
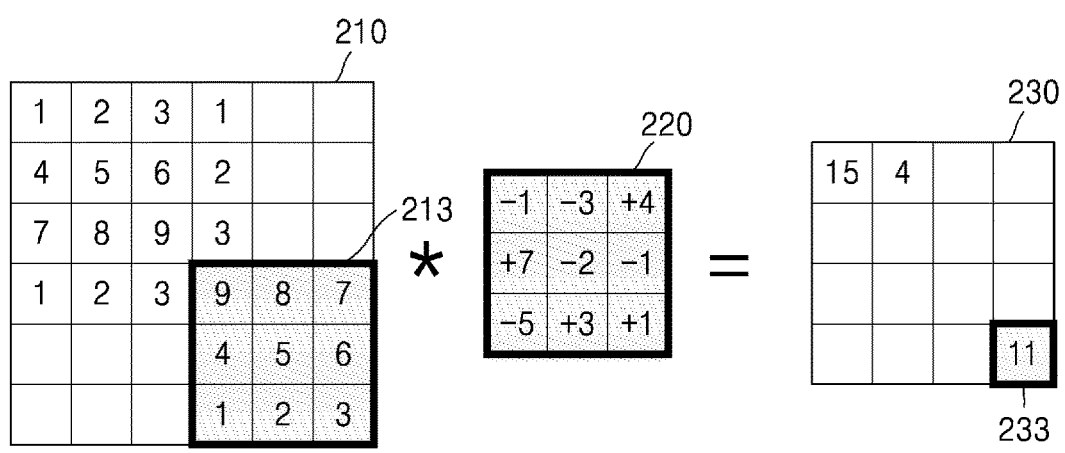

Referring to FIG. 2C, a convolution operation between the sixteenth region 213, which is the last window of the input feature map data 210, and the kernel data 220 is performed, and thus, a result of 11, which is a pixel value 233 of the fourth row and fourth column of the output feature map data 230, is determined.

In FIGS. 2A-2C, examples of a two-dimensional convolution operation have been described. However, the convolution operation may correspond to a three-dimensional convolution operation in which input feature map data, kernel data, and output feature map data of a plurality of channels exist. The three-dimensional convolution operation will be described with reference to FIG. 3.

Figure 3:
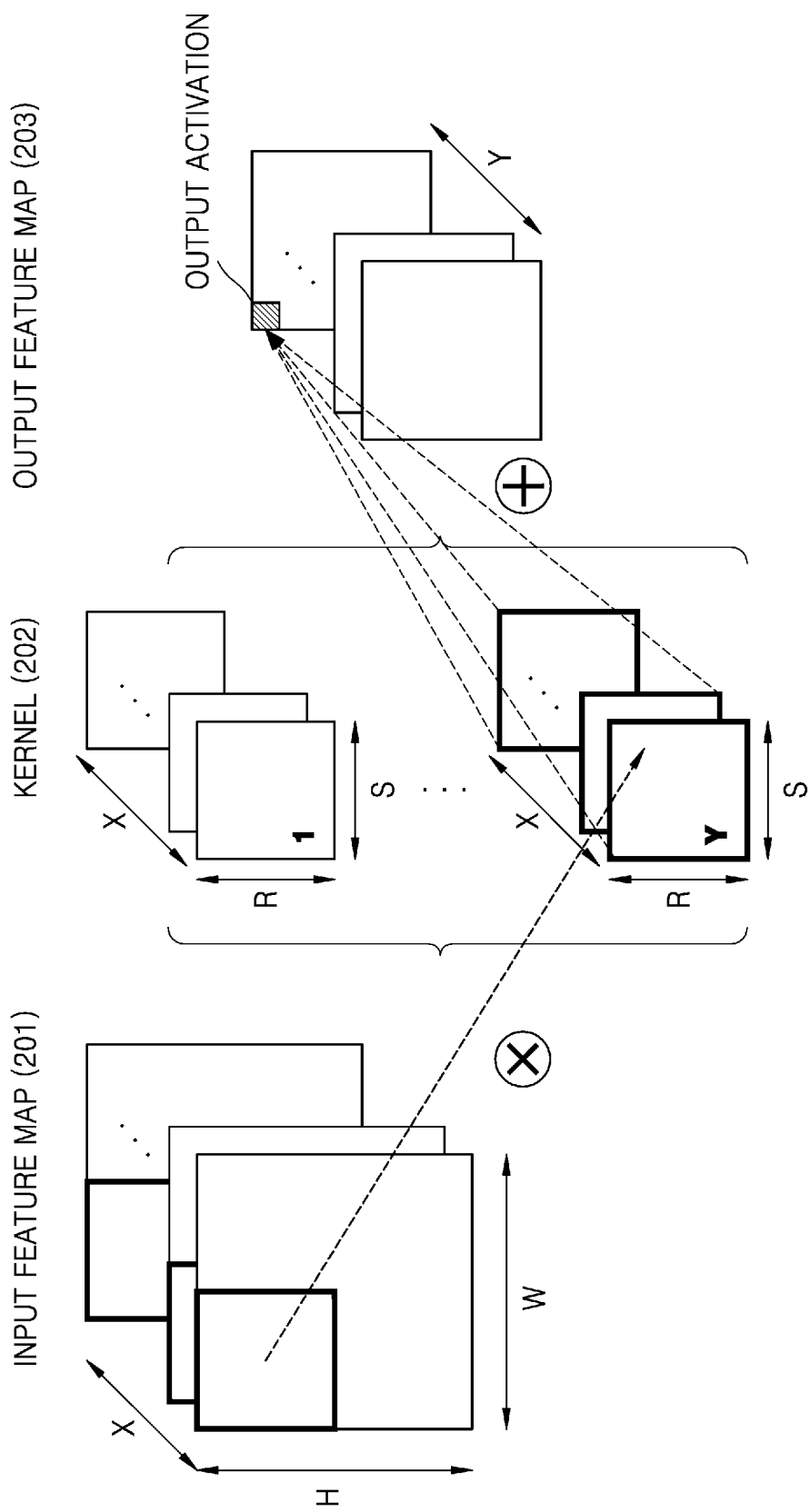

Referring to FIG. 3, an input feature map data 201 may have a three-dimensional size, and may include X input channels, and a two-dimensional input feature map data of each input channel may have a size of H rows and W columns (where X, W, and H are natural numbers). A kernel data 202 may have a 4-dimensional size, and a 2-dimensional kernel having a size of an R row S column may exist as many as X input channels and Y output channels (where R, S, and Y are natural numbers). In other words, the kernel data 202 may have a number of channels corresponding to the number of input channels X of the input feature map data 201 and the number of output channels Y of the output feature map data 203, and a two-dimensional kernel of each channel may have a size of R rows and S columns. The output feature map data 203 may be generated through a three-dimensional convolution operation between the three-dimensional input feature map data 201 and the four-dimensional kernel data 202, and Y channels may exist according to the three-dimensional convolution operation result.

An example process of generating output feature map data through a convolution operation between one two-dimensional input feature map data and one two-dimensional kernel data may be implemented as described above with reference to FIGS. 2A-2C. The output feature map data 203 of the Y channels may be generated by repeatedly performing the two-dimensional convolution operation between the input feature map data 201 of the X input channels and the kernel data 202 of the X input channels and the Y output channels described with reference to FIGS. 2A-2C.

Figure 4:
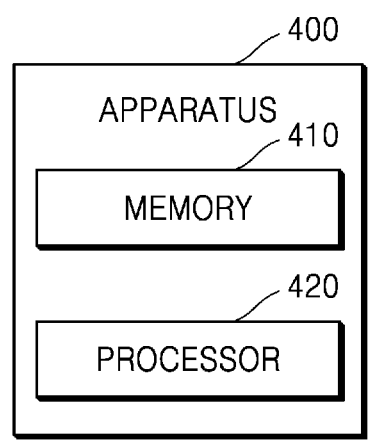
FIG. 4 illustrates an example data processing apparatus, in accordance with one or more embodiments.

FIG. 4 illustrates an example data processing apparatus 400.

Referring to FIG. 4, the data processing apparatus 400 includes a memory 410 and a processor 420. In an example, the data processing apparatus 400 may further store instructions, e.g., in memory 410, which when executed by the processor 420 configure the processor 4200 to implement one or more or any combination of operations herein. The processor 420 and the memory 410 may be respectively representative of one or more processors 420 and one or more memories 410. Also, although not shown in FIG. 4, the data processing apparatus 400 may be connected to an external memory. In the data processing apparatus 400 of FIG. 4, only components related to the present embodiment are depicted. Accordingly, it will be apparent to those skilled in the art that other general-purpose components may further be included in the data processing apparatus 400 in addition to the components shown in FIG. 4.

The data processing apparatus 400 may be a device in which the neural network described above with reference to FIGS. 1 to 3 is implemented. For example, the data processing apparatus 400 may be implemented with various kinds of devices, such as, but not limited to, a personal computer (PC), a server device, a mobile device, and an embedded device. As a specific example, the data processing apparatus 400 may correspond to, or be an apparatus provided in, as non-limiting examples, a smart phone, a tablet device, an AR (Augmented Reality) device, an Internet of Things (IoT) device, autonomous driving robotics, medical devices, etc. that perform processes such as, but not limited to voice recognition, image recognition, image classification, etc. by implementing a neural network, but is not limited thereto. Additionally, the data processing apparatus 400 may correspond to a dedicated hardware accelerator (HW accelerator) mounted on the above-described device, and may be a hardware accelerator, such as a neural processing unit (NPU), a tensor processing unit (TPU), a neural engine, or the like, which is a dedicated module for driving a neural network.

The memory 410 is hardware for storing various data processed in the data processing apparatus 400. For example, the memory 410 may store data processed by the data processing apparatus 400 and data to be processed. Also, the memory 410 may store applications, drivers, and the like to be driven by the data processing apparatus 400.

The memory 410 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 420 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, CD-ROM, Blu-ray or other optical disk storage, hard disk drive (HDD), solid state drive (SSD), or flash memory or Memory Sticks.

The processor 420 is a hardware configuration that controls overall functions for driving the neural network in the data processing apparatus 400. For example, the processor 420 generally controls the data processing apparatus 400 by executing programs stored in the memory 410. The processor 420 may be implemented as a central processing unit (CPU), a graphics processing unit (GPU), an application processor (AP), etc. provided in the data processing apparatus 400, but is not limited thereto.

The processor 420 reads/writes data (for example, image data, feature map data, kernel data, etc.) from the memory 410, and executes a neural network with the read/write data. When the neural network is executed, the processor 420 drives a processing unit included therein to repeatedly perform a convolution operation between input feature map data and kernel data to generate output feature map data. In this example, an amount of calculation of the convolution operation may be determined depending on various factors, such as the number of channels of the input feature map data, the number of channels of the kernel data, the size of the input feature map data, the size of the kernel data, and the precision of the output value.

In an example, the processing unit may include a logic circuit for convolutional operations. Specifically, the processing unit may include an operator implemented by a combination of a multiplier, an adder, and an accumulator. In addition, a multiplier may be implemented in a combination of a plurality of sub-multipliers, and an adder may be implemented in a combination of a plurality of sub-adders.

The processor 420 may further include an on-chip memory that is responsible for caching to perform convolution operations and a dispatcher for dispatching various operands, such as pixel values of input feature map data or weight values of kernel data. For example, the dispatcher dispatches operands, such as pixel values and weight values required for an operation to be performed by the processing unit from data stored in the memory 410 to the on-chip memory. Afterwards, the dispatcher re-dispatches the operands dispatched to the on-chip memory back to the processing unit for convolution operation.

The processor 420 may generate the same result as the result of the group convolution operation. Here, the group convolution may denote a method of performing independent convolution by dividing channels of input feature map data into a plurality of groups. Hereinafter, the group convolution will be described with reference to FIG. 5.

Figure 5:
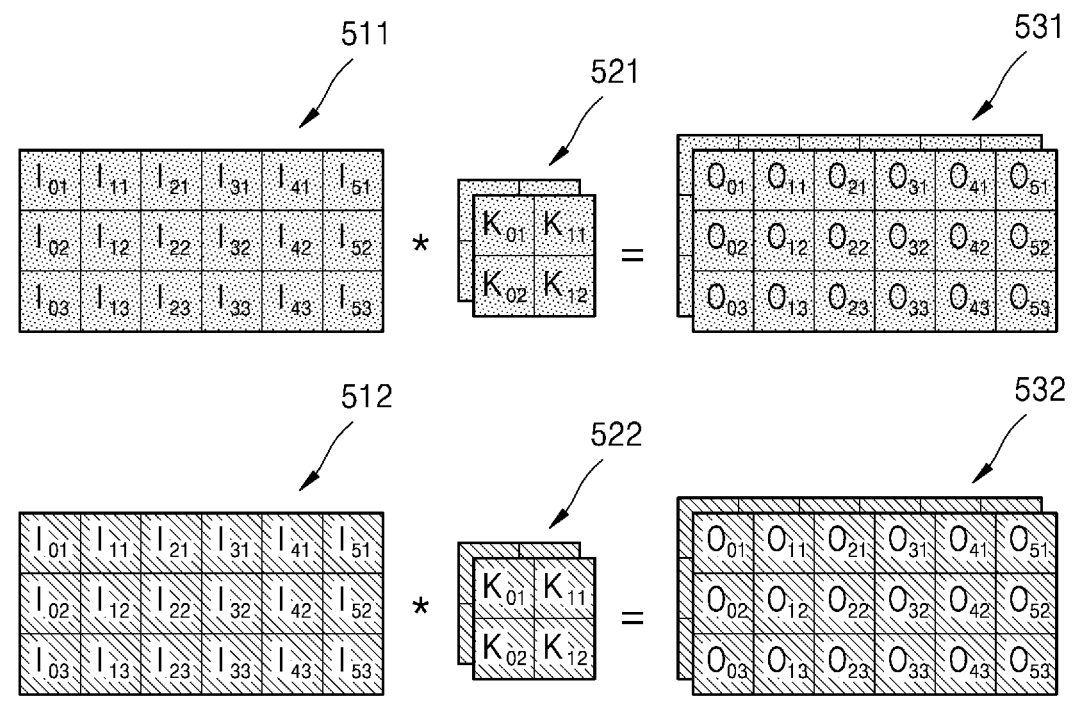

FIG. 5 illustrates an example of group convolution, in accordance with one or more embodiments.

FIG. 5 illustrates input feature map data 511 and 512, kernel data 521 and 522, and output feature map data 531 and 532 in a single layer of a neural network. In an example, it is assumed that the output feature map data 531 and 532 are generated by a convolution operation of the input feature map data 511 and 512 and the kernel data 521 and 522.

In an example, when there are a large number of channels of an input image that are input to the neural network, a large number of multiplier-accumulators (MAC) are required to generate an output. For example, if the size of input feature map data is W*H, the size of kernel data is kx*ky, the number of input channels is #InC, and the number of output channels is #OtC, in order to complete the operation of a single layer of the neural network, MACs as much as W*H*kx*ky*#InC*#OtC may be needed.

Group convolution is a of neural network lightweighting technique. Specifically, the group convolution technique may independently perform convolution by dividing channels of the input feature map data into several groups. Therefore, in contrast to performing a normal convolution operation, the group convolution may need a small number of MACs needed for an operation, and a parallel operation is possible.

Referring to FIG. 5, the input feature map data 511 and 512 divided into two groups is illustrated. The input feature map data 511 may undergo a convolution operation with the kernel data 521, and as a result, the output feature map data 531 is generated. Similarly, the input feature map data 512 may undergo a convolution operation with the kernel data 522, and as a result, the output feature map data 532 may be generated. A final output feature map data may be generated in a single layer of the neural network by combining the output feature map data 531 with the output feature map data 532.

However, it may be inefficient to perform group convolution operations through general hardware that implements a convolutional neural network. For example, if a group convolution operation is performed by using general processing units, it may be inefficient since a single processing unit per single layer must perform multiple convolution operations.

The data processing apparatus 400 may manipulate data used for the group convolution operation. For example, the data processing apparatus 400 may manipulate kernel data based on the number of input channels, the number of output channels, and the number of groups. As the data processing apparatus 400 may manipulate the kernel data, a result (that is, output feature map data) generated by the data processing apparatus 400 may be the same as the result generated as the group convolution operation is performed. Accordingly, even if the data processing apparatus 400 is implemented with a normal processing unit, the group convolution operation may be efficiently performed.

Hereinafter, an example of a convolution operation by the data processing apparatus 400 will be described in detail with reference to FIGS. 6 to 8.

Figure 6:
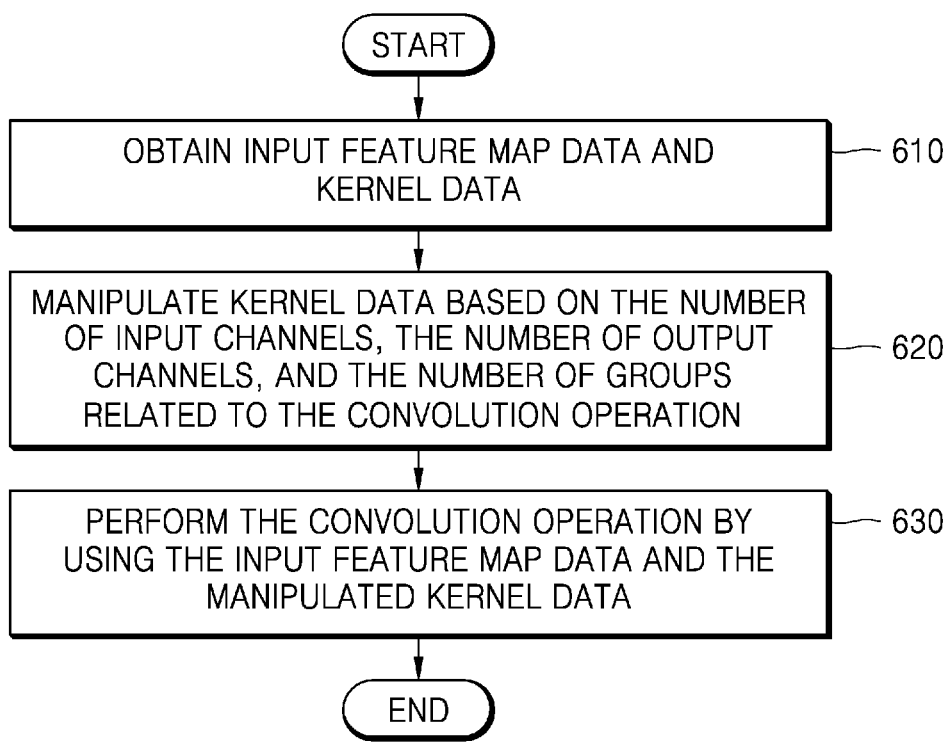
FIG. 6 is a flowchart illustrating an example method of performing a convolution operation, in accordance with one or more embodiments.

FIG. 6 is a flowchart illustrating an example method of performing a convolution operation, in accordance with one or more embodiments. The operations in FIG. 6 may be performed in the sequence and manner as shown. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, a method of performing a convolution operation is composed of operations that may be processed in time series in the data processing apparatus 400 depicted in FIG. 4. Therefore, even though omitted below, the descriptions given with respect to the data processing apparatus 400 shown in FIG. 4 may be applied to the method of performing a convolution operation of FIG. 6.

In operation 610, the processor 420 may obtain input feature map data and kernel data.

The processor 420 may read input feature map data and kernel data stored in the memory 410. For example, the input feature map data and the kernel data may be data on which group convolution is performed. The group convolution is as described above with reference to FIG. 5. In other words, the processor 420 may obtain input feature map data that may be divided into a plurality of groups and kernel data divided into a plurality of groups.

In operation 620, the processor 420 manipulates or determines kernel data based on the number of input channels, the number of output channels, and the number of groups related to the convolution operation.

For example, processor 420 may create a default tensor, and replace some of elements of the default tensor with kernel data. Here, the default tensor may be a tensor consisting of zeros. In other words, the elements of the default tensor may be zero.

The processor 420 may determine the size of the default tensor based on the number of input channels and the number of output channels. Also, the processor 420 may determine the size of a sub-tensor included in the default tensor as the size of the kernel data.

An example of manipulating the kernel data by the processor 420 will be described below with reference to FIGS. 7 and 8.

In operation 630, the processor 420 performs a convolution operation by using the input feature map data and the manipulated kernel data.

The method of performing a convolution operation by the processor 420 is as described above with reference to FIGS. 2 and 3. Therefore, hereinafter, a detailed description of the method of performing a convolution operation by the processor 420 will be omitted.

Although not shown in FIG. 6, the processor 420 may perform zero-skipping on the input feature map data and/or the manipulated kernel data and may perform a convolution operation by using the zero-skipping data. Accordingly, the processor 420 may prevent an unnecessary increase in the amount of calculation during the convolution operation.

Figure 7:
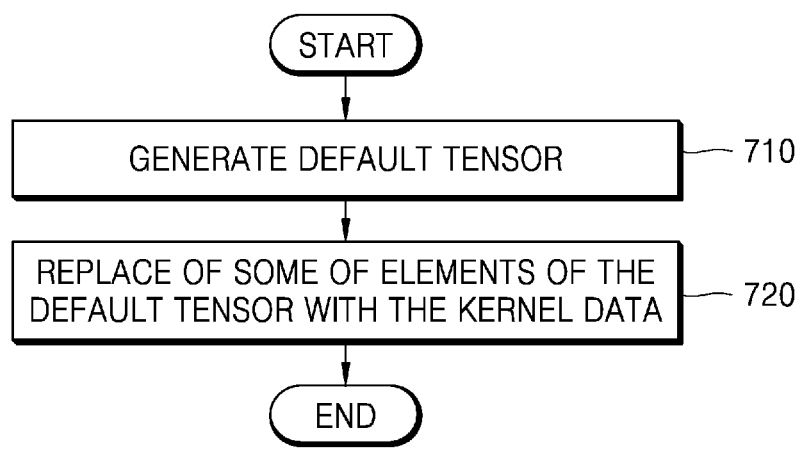
FIG. 7 is a flowchart illustrating an example of manipulating kernel data by a processor, in accordance with one or more embodiments.

FIG. 7 is a flowchart illustrating an example of manipulating kernel data by the processor 420, in accordance with one or more embodiments. The operations in FIG. 7 may be performed in the sequence and manner as shown. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, the processor 420 may generate a default tensor.

In an example, the default tensor may denote tensors that contain zero as an element.

The processor 420 may determine the size of the default tensor based on the number of input channels and the number of output channels. For example, assuming that the number of input channels is #InC, the number of output channels is #OtC, and the size of the kernel data is kx*ky, the processor 420 determines the size of the default tensor as (#InC, #OtC, kx, and ky). Also, the processor 420 may determine that each element included in the tensor having the size of (#InC, #OtC, kx, and ky) is 0.

In operation 720, the processor 420 may replace some of elements of the default tensor with kernel data.

The processor 420 may divide the default tensor into a plurality of sub-tensors. In this example, the processor 420 may determine the size of each of the sub-tensors as the size of kernel data.

The processor 420 may replace at least one of the plurality of sub-tensors with kernel data. At this point, the processor 420 may sequentially replace the sub-tensor with kernel data in a first direction. For example, the first direction may be a direction corresponding to the output channels, but is not limited thereto.

Hereinafter, an example of manipulating kernel data by the processor 420 according to the flowchart of FIG. 7 will be described with reference to FIG. 8.

Figure 8:
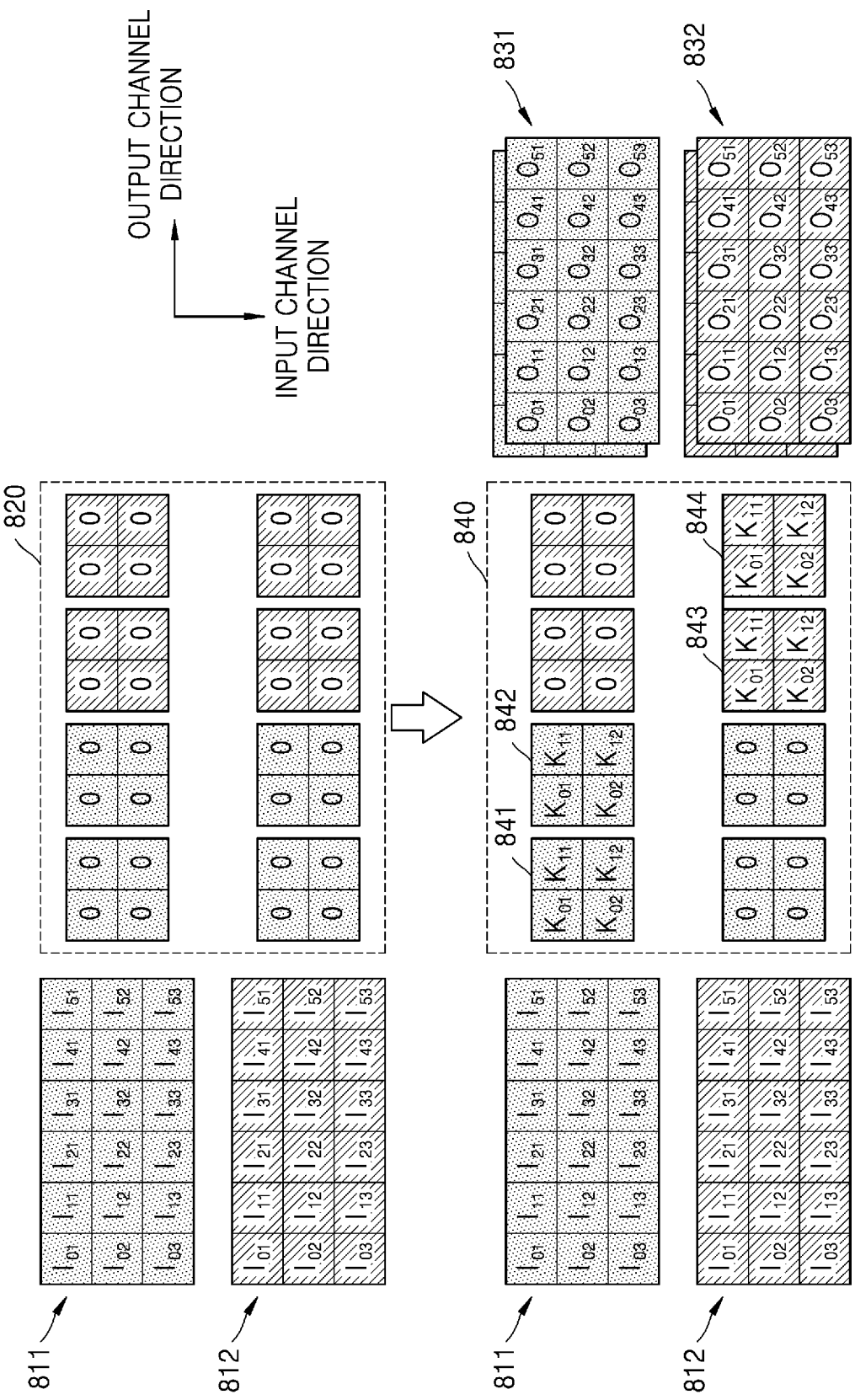
FIG. 8 illustrates an example of manipulating kernel data by a processor, in accordance with one or more embodiments.

FIG. 8 illustrates an example of manipulating kernel data by the processor 420, in accordance with one or more embodiments.

FIG. 8 illustrates input feature map data 811 and 812, and output feature map data 831 and 832 in a single layer of the neural network. Additionally, a default tensor 820 and a manipulated default tensor 840 are illustrated in FIG. 8.

For convenience of description, an assumption may be made that the input feature map data 811 and 812 of FIG. 8 may be the same as the input feature map data 511 and 512 of FIG. 5. Additionally, although not shown in FIG. 8, it is assumed that kernel data is the same as the kernel data 521 and 522 of FIG. 5.

The processor 420 generates the default tensor 820. For example, assuming that the number of input channels is 2, the number of output channels is 4, and the size of kernel data is 2*2, the processor 420 may determine the size of the default tensor 820 to be (2, 4, 2, 2). In addition, the processor 420 may set elements of the default tensor 820 to zero.

The processor 420 may generate manipulated kernel data 840 by replacing some of the elements of default tensor 820 with kernel data. First, the processor 420 may divide the default tensor 820 into a plurality of sub-tensors. In the example described above, the size of kernel data 521 and 522 is 2*2. Accordingly, the processor 420 may determine the size of the sub-tensor to be 2*2.

The processor 420 may replace some of the plurality of sub-tensors with kernel data. At this time, the processor 420 may determine a location of the sub-tensor at which the replacement of the kernel data begins according to the number of input channels, the number of output channels, and the number of groups. For example, assuming that the number of input channels is #InC, the number of output channels is #OtC, the number of groups is #Group, and the index of kernel data is g, the processor 420 may determine a location of a sub-tensor at which the replacement of the kernel data begins to be (#InC/#Group*g, #OtC/#Group*g).

Then, the processor 420 may sequentially replace the sub-tensor with kernel data in the first direction from the sub-tensor indicating the location of (#InC/#Group*g, #OtC/#Group*g). For example, the first direction may be a direction corresponding to the output channels (the 'output channel direction' as illustrated in FIG. 8).

Referring to the example depicted in FIGS. 5 and 8, in a non-limiting example, the number of input channels is 2, the number of output channels is 4, and the number of groups is 2. Also, the index of the kernel data 521 is 0, and the index of the kernel data 522 is 1.

In this example, the processor 420 may determine the location of the sub-tensor at which the replacement with the kernel data 521 begins to be (2/2*0, 4/2*0)=(0,0). In other words, referring to FIG. 8, the processor 420 may determine a sub-tensor 841 indicating the location of (0,0) in the default tensor 820 as a starting point for replacing the kernel data 521. Additionally, the processor 420 may also replace the sub-tensor 842 with kernel data in a direction corresponding to the output channels.

Additionally, the processor 420 may determine the location of the sub-tensor at which the replacement with the kernel data 522 begins to be (2/2*1, 4/2*1)=(1,2). In other words, referring to FIG. 8, the processor 420 may determine a sub-tensor 843 indicating the location of (1,2) in the default tensor 820 as a starting point to be replaced with the kernel data 522. Additionally, the processor 420 may replace the sub-tensor 844 with kernel data in a direction corresponding to the output channels.

Accordingly, a manipulated kernel data 840 may be generated by replacing the sub-tensors 841, 842, 843, and 844 with the kernel data 521 and 522 in the default tensor 820.

The processor 420 may generate output feature map data 831 and 832 by performing a convolution operation on the input feature map data 811 and 812 and the manipulated kernel data 840. Additionally, the processor 420 may generate a final output feature map data in a single layer of the neural network by combining the output feature map data 831 and 832.

At this time, the output feature map data 831 and 832 of FIG. 8 may be generated in a same manner as the output feature map data 531 and 532 of FIG. 5. In other words, the processor 420 may generate the same result as that of the group convolution operation even when performing the normal convolution operation.

The processor 420 may perform zero-skipping on the input feature map data 811 and 812 and/or the manipulated kernel data 840 and may perform a convolution operation by using data on which the zero-skipping is performed. Accordingly, the processor 420 may prevent an unnecessary increase in the amount of calculation during the convolution operation.

As described above, the data processing apparatus 400 may generate the same result as the group convolution operation even by performing a normal convolution operation by manipulating kernel data. Therefore, a group convolution operation may be efficiently performed even through general hardware that implements a convolutional neural network.

The neural network apparatuses, the data processing apparatus 400, processor 420, memory 410, and other apparatuses, units, modules, devices, and other components described herein and with respect to FIGS. 1-8, are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-8 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of performing a convolution operation, the method comprising:
   obtaining input feature map data and kernel data;
   manipulating the kernel data by reconfiguring the kernel data based on a number of input channels of the input feature map, a number of groups of the kernel data, and a number of channels of the kernel data related to the convolution operation; and
   performing the convolution operation based on the input feature map data and the manipulated kernel data.

2. The method of claim 1, wherein the number of channels of the kernel data and a number of output channels of an output feature map related to the convolution operation are the same.

3. The method of claim 1, wherein the manipulating of the kernel data comprises:
   generating a default tensor; and
   replacing one or more elements of the default tensor with the kernel data.

4. The method of claim 3, wherein a size of the default tensor is determined based on the number of input channels and a number of output channels.

5. The method of claim 3, wherein the replacing of the one or more elements of the default tensor with the kernel data comprises sequentially replacing the one or more elements of the default tensor with the kernel data in a first direction.

6. The method of claim 5, wherein the first direction is a direction corresponding to output channels of an output feature map.

7. A processor-implemented method of performing a convolution operation, the method comprising:
   obtaining input feature map data and kernel data;
   manipulating the kernel data based on a number of input channels of the input feature map, a number of groups of the kernel data, and a number of channels of the kernel data related to the convolution operation; and
   performing the convolution operation based on the input feature map data and the manipulated kernel data,
   wherein the manipulating of the kernel data comprises:
   generating a default tensor; and
   replacing one or more elements of the default tensor with the kernel data.

8. The method of claim 7, wherein the default tensor comprises a tensor comprising zeros.

9. The method of claim 7, wherein a size of the default tensor is determined based on the number of input channels and a number of output channels of an output feature map.

10. The method of claim 7, wherein each of the input feature map data and the kernel data comprises data on which a group convolution operation is performed.

11. The method of claim 7, wherein the replacing of the one or more elements of the default tensor with the kernel data comprises sequentially replacing the one or more elements of the default tensor with the kernel data in a first direction.

12. The method of claim 11, wherein the first direction is a direction corresponding to an output channel of an output feature map.

13. A non-transitory computer-readable storage medium storing instructions that, when executed by a processor, cause the processor to perform the method of claim 1.

14. A neural network apparatus comprising:
   one or more processors configured to:
   obtain input feature map data and kernel data,
   manipulate the kernel data based on a number of input channels of the input feature map, a number of groups of the kernel data, and a number of channels of the kernel data related to a convolution operation, and perform the convolution operation based on the input feature map data and the manipulated kernel data.

15. The apparatus of claim 14, wherein the processor is further configured to generate a default tensor, and replace one or more elements of the default tensor with the kernel data.

16. The apparatus of claim 15, wherein a size of the default tensor is determined based on the number of input channels and a number of output channels of an output feature map.

17. The apparatus of claim 15, wherein the processor is further configured to sequentially replace the one or more elements of the default tensor with the kernel data in a first direction.

18. The apparatus of claim 17, wherein the first direction is a direction corresponding to an output channel of an output feature map.

19. The apparatus of claim 14, wherein each of the input feature map data and the kernel data comprises data on which a group convolution operation is performed.

20. The apparatus of claim 14, further comprising a memory storing instructions that, when executed by the one or more processors, configure the one or more processors to perform the obtaining of the input feature map data and kernel data, the manipulating of the kernel data, and the performing of the convolution operation.

* * * * *